(12) United States Patent
Zander et al.

(10) Patent No.: US 10,352,388 B2
(45) Date of Patent: Jul. 16, 2019

(54) ARTICLE, PARTICULARLY AN AIR SPRING BELLOWS, A METAL-RUBBER ELEMENT, OR A VIBRATION DAMPER

(71) Applicant: ContiTech Luftfedersysteme GmbH, Hannover (DE)

(72) Inventors: Christoph Zander, Großhansdorf (DE); Thorsten Leethaus, Eschershausen (DE); Mark Lindenberg, Garbsen (DE); Hans-Harald Kielbasiewicz, Jesteburg (DE); Lars Bucksch, Hannover (DE)

(73) Assignee: ContiTech Luftfedersysteme GmbH, Hannover (DE)

( * ) Notice: Subject to any disclaimer, the term of this patent is extended or adjusted under 35 U.S.C. 154(b) by 103 days.

(21) Appl. No.: 15/511,658

(22) PCT Filed: Jul. 16, 2015

(86) PCT No.: PCT/EP2015/066233
§ 371 (c)(1),
(2) Date: Mar. 16, 2017

(87) PCT Pub. No.: WO2016/045813
PCT Pub. Date: Mar. 31, 2016

(65) Prior Publication Data
US 2017/0307042 A1    Oct. 26, 2017

(30) Foreign Application Priority Data
Sep. 26, 2014   (DE) .................. 10 2014 219 613

(51) Int. Cl.
*F16F 1/36* (2006.01)
*B32B 27/36* (2006.01)
(Continued)

(52) U.S. Cl.
CPC .......... *F16F 1/3605* (2013.01); *B29D 22/023* (2013.01); *B32B 1/00* (2013.01);
(Continued)

(58) Field of Classification Search
CPC ......... B32B 5/022; B32B 5/024; B32B 5/026; B32B 27/18; B32B 27/32; B32B 27/327;
(Continued)

(56) References Cited

U.S. PATENT DOCUMENTS 4,688,777 A * 8/1987 Mekosh, Jr. .............. B61F 5/10
                                                      105/197.05
4,818,588 A * 4/1989 Okabe ................. B29C 61/0616
                                                       428/201

(Continued)

FOREIGN PATENT DOCUMENTS

CN      102470631 A     5/2012
DE      1287453 B       1/1969
(Continued)

*Primary Examiner* — Walter Aughenbaugh
(74) *Attorney, Agent, or Firm* — David L. Cate

(57) ABSTRACT

The invention relates to an article comprising a main body (6, 7, 8) that consists of a polymer material having elastic properties, particularly an air spring bellows (2), a metal-rubber element or a vibration damper. In order for fire-retardant properties to be improved, the article is provided, partially or fully, with a cover (9) formed from at least one flat textile structure and/or at least one three-dimensional textile structure and/or at least one shrink film. The cover can be fire-retardant itself or can be equipped to be fire-retardant.

2 Claims, 1 Drawing Sheet

(51) Int. Cl.
*F16F 9/38* (2006.01)
*B32B 27/18* (2006.01)
*F16F 9/04* (2006.01)
*B32B 27/32* (2006.01)
*F16F 1/38* (2006.01)
*B29D 22/02* (2006.01)
*F16F 9/05* (2006.01)
*B32B 5/02* (2006.01)
*B32B 25/08* (2006.01)
*B32B 25/10* (2006.01)
*B32B 27/12* (2006.01)
*B32B 27/28* (2006.01)
*B32B 27/30* (2006.01)
*B32B 1/00* (2006.01)
*B32B 1/08* (2006.01)
*B32B 7/05* (2019.01)
*F16G 1/21* (2006.01)

(52) U.S. Cl.
CPC ............... *B32B 1/08* (2013.01); *B32B 5/02* (2013.01); *B32B 5/024* (2013.01); *B32B 7/05* (2019.01); *B32B 25/08* (2013.01); *B32B 25/10* (2013.01); *B32B 27/12* (2013.01); *B32B 27/18* (2013.01); *B32B 27/283* (2013.01); *B32B 27/304* (2013.01); *B32B 27/32* (2013.01); *B32B 27/327* (2013.01); *B32B 27/36* (2013.01); *F16F 1/38* (2013.01); *F16F 9/0409* (2013.01); *F16F 9/0418* (2013.01); *F16F 9/05* (2013.01); *F16F 9/38* (2013.01); *B32B 2255/02* (2013.01); *B32B 2260/02* (2013.01); *B32B 2262/02* (2013.01); *B32B 2262/0261* (2013.01); *B32B 2262/06* (2013.01); *B32B 2262/08* (2013.01); *B32B 2262/10* (2013.01); *B32B 2307/00* (2013.01); *B32B 2307/51* (2013.01); *B32B 2307/546* (2013.01); *B32B 2597/00* (2013.01); *B32B 2605/00* (2013.01); *F16F 2224/02* (2013.01); *F16F 2230/0023* (2013.01); *F16F 2238/02* (2013.01); *F16G 1/21* (2013.01)

(58) Field of Classification Search
CPC .... B32B 37/144; B29D 22/023; F16F 1/3605; F16F 9/04; F16F 9/0409; F16F 9/0418; F16F 9/05; F16F 9/38
See application file for complete search history.

(56) References Cited

U.S. PATENT DOCUMENTS

| | | | |
|---|---|---|---|
| 9,073,125 B2 * | 7/2015 | Howard, Jr. | A61K 31/722 |
| 2005/0084638 A1 * | 4/2005 | Kerstetter, III | B32B 25/10 428/36.1 |
| 2009/0202758 A1 * | 8/2009 | Hiruma | B29C 61/003 428/34.9 |
| 2012/0009835 A1 | 1/2012 | Uwe | |

FOREIGN PATENT DOCUMENTS

| | | |
|---|---|---|
| DE | 102006016144 A1 | 10/2007 |
| EP | 1371872 A1 | 12/2003 |

* cited by examiner

ARTICLE, PARTICULARLY AN AIR SPRING BELLOWS, A METAL-RUBBER ELEMENT, OR A VIBRATION DAMPER

The invention relates to an article having a main body composed of a polymeric material having elastic properties, in particular an air spring bellows, a metal-rubber element or a vibration damper.

Polymeric articles used for the suspension of, for example, motor vehicles or track vehicles and/or vibration damping are made using elastomeric mixtures, also known as rubber mixtures. These elastomeric mixtures typically used for the fundamental properties of such articles are well known. Articles having outstanding elastic properties, for example metal-rubber elements or vibration dampers, preferentially contain vulcanized mixtures of rubber which are predominantly based on natural rubber (NR) and/or polyisoprene rubber (IR). Articles having very good resistance to weathering, mineral oil and heat, examples being air spring bellows, preferentially contain vulcanized mixtures of rubber which are predominantly based on chloroprene rubber (CR).

However, articles comprising these elastomeric mixtures display distinct disadvantages in fire behavior. The evolution of thick smoke is one of the consequences of a fire. The heat release rate is particularly high in the combustion process of those of the aforementioned elastomeric mixtures which are predominantly based on NR and/or IR. The evolving smoke from the combustion process of elastomeric mixtures based predominantly on CR is toxic to humans and animals.

The recent increase in fire protection requirements as reflected above all in the tightened fire protection standard EN45545 is driving an increased need for polymer articles optimized in fire protection. These fire protection requirements are no longer met either by the aforementioned elastomeric mixtures that are predominantly based on NR and/or IR, above all because of the required maximum heat release rate, but also the flame-resistant elastomeric mixtures that are predominantly based on CR, particularly because of the required smoke toxicity. Articles comprising these elastomeric mixtures thus usually no longer meet the tightened requirements.

A usual way to improve the fire behavior of rubber mixtures is to directly incorporate fire-retardant substances into the mixture. However, the general consequence of taking this measure with the articles in question is that there is a significant deterioration in their physical properties, particularly the suspension, setting and/or vibration properties. WO 2014/019008 A1 proposes solving this problem by using an exclusively sulfur-crosslinked additional outer ply comprising a thermoplastic polymer comprising vinyl acetate, an unsaturated elastomer comprising double bonds and at least one flameproofing agent. This additional outer ply has to be vulcanized onto the component part, or to be more precise onto the main body of the component part, at comparatively high vulcanization temperatures via a precisely controlled vulcanization process. WO 2014/019008A1 thus requires a vulcanization process being carried out twice in succession. This not only entails higher manufacturing cost and inconvenience, but the twofold vulcanization can also lead to undesired and harmful reversionary processes in the already vulcanized polymeric mixture underneath the outer ply. It is particularly polymer mixtures based predominantly on NR and/or IR which display significant reversionary processes in the event of any overvulcanization. To improve the fire behavior of the overall article, this additional outer ply further has to have a uniform minimum ply thickness, requiring an inconvenient and costly second vulcanization mold. What is more, this outer ply when having a composition as per WO 2014/019008 A1 has distinct disadvantages with regard to mineral oil resistance, which fact is unfavorable in rail transport in particular and more particularly with air springs.

EP 2196492 B1 has a flame-retardant coating being vulcanized directly onto the elastomeric body. This ensures some shielding of the elastomeric body, at least in the regions whereto the flame-retardant coating was applied. The coating in question comprises at least one polymeric binder and at least expandable graphite as flame-retardant substance. The coating composition is initially dissolved in solvents while complying with all safety measures required, then applied to the component part and finally vulcanized. The issue here is the abrasion resistance of the coating composition. Furthermore, not only the elasticity but also the breaking extension of the coating has to be adjusted such that the vehicle operation does not give rise to any premature cracking in the coating and/or any embrittlement of the coating. Once cracking in the coating is overly advanced, the protection of the main body is no longer complete. In the event of excessive embrittlement, a fire can cause the coating to become directly fissured with numerous cracks, or even fall off directly, as a result of the expansion (=volume increase) of the expandable graphite. The vulcanization of the coating can, as already mentioned above, lead to reversioning in the plies underneath.

Since air spring bellows, metal-rubber elements and vibration dampers are exposed to very severe mechanical stresses, particularly when employed in track transportation, coatings of this type have to have comparable elastic properties to the polymeric main body in order that coatings of this type when in service do not display any premature cracks or even become detached. This makes the combination of materials which is described in WO 2014/019008 A1 difficult and potentially disadvantageous. In EP 2196492 B1, a sufficiently large amount of expandable graphite has to be employed in order that appropriate fire protection may be ensured, which in turn has adverse consequences for the physical properties, particularly the elasticity and the breaking extension. Moreover, both options constitute a distinct extra burden in the industrial manufacturing process and particularly the use of organic solvents can lead to health issues for production staff.

The invention then has for its object to provide an article having an optimized fire protection behavior to meet the tightened requirements, particularly those described in EN-45545. At the same time, it is the intention for the required physical characteristics of the article to remain at a similar level, and for the complexity in the production process to not be significantly increased.

This object is achieved when the article having a main body composed of a polymer material having elastic properties has an article surface which is completely or partially provided at least one cover, wherein the cover is formed from at least one sheetlike textile construct and/or from at least one spacelike textile construct and/or from at least one shrink film.

A cover (Überzug) is defined by the Duden dictionary of the German language as a kind of fabric envelope that affords something protection.

In the context of the present invention, the cover protects the article against destruction by a possible fire. This cover consists of at least one sheetlike textile construct and/or of at least one spacelike textile construct and/or of at least one shrink film—each of which may of itself have a fire-retardant effect and/or has a fire-retardant finish.

Partially is to be understood as meaning in this context that merely certain, defined regions and/or portions of the article surface of the overall article are provided a cover. The cover may be firmly adherent to the article surface, but may also not be in direct contact with the article surface.

When the cover is firmly adherent to the article, a complete provision will render the entire article surface fire-protected and a partial provision will render fire-protected those regions/portions of the article surface which are covered by the cover.

The adherence of a firmly attached sheetlike or spacelike textile construct to the article surface based on at least one polymer is generally greater than with coatings purely optimized with regard to fire protection. The physical and chemical aspects of the bond are complemented by an additional aspect of mechanical bonding due to the anchoring into the rubber surface of the textile threads of the sheetlike or spacelike textile construct. A specifically adherence-improvingly optimized preparation of and/or on the inside face of the textile may be used to additionally enhance the adherence between the textile and the article surface.

When the cover itself is noncombustible, the article will as a whole be more fire-protected than by one or more coating add-ons alone.

When the cover is not in direct contact with the article surface, no adherence-improving preparation on or of the textile is needed. The sheetlike or spacelike textile construct may thus be fire-retardingly finished from both sides and, as a result, the fire-retardant finish can expand in both directions in the event of a fire. Double protection from the heat source and/or the flames is accordingly provided.

The flexibility and/or elasticity of the cover and also the elasticity and breaking extension of the fire-retardant finish of the cover further have to meet reduced requirements when the cover—with or without finish—is not firmly adherent and thus does not have to completely move with the movements of the article. Nor does the attainment of adequate adherence necessitate any formulation changes to the polymer mixture constituting the main body of the article.

A measure of adherence is attainable by using a suitable adhesion-promoting layer and/or mixture or by activating the article surface, for example by etching. A measure of adherence is also attainable by using a suitable primer, for example a primer to functionalize the article surface. Halogenation, especially chlorination, will prove to be a particularly suitable way to functionalize the article surface. However, other ways and means/methods of functionalization are also conceivable. In the case of adherence, the cover combines with the article surface to form an adhesively bonded assembly.

The sheetlike textile construct here may preferably be configured as a felt, a fibrous nonwoven web, a weave, a braid, a knit or a non-crimp fabric. The sheetlike textile construct is preferably a woven fabric, meaning that the fabric sheet is produced by intercrossing two systems of threads, namely a warp and a weft, or a knitted fabric, where a thread loop intermeshes with another loop and where the knitted loops thus produced may be formed using one or more threads.

When a weave is used, particularly the use of a so-called bi-stretch weave will prove advantageous. When a bi-stretch weave is used, the weave is able to move with all extension directions of the article and also even at the stage of the article blank, particularly without undesirable creasing being incurred in the shaping process, for example in the shaping process to produce air spring bellows.

The spacelike textile construct may take the form of a tube, of a sock or of a part-processed textile product.

A tube or sock of this type is ideally conformable to the contour of the article, particularly the contour of the air spring bellow, of the metal-rubber element or of the vibration damper.

The two textile constructs are each constructed from textile fibers processable in the textile process of manufacture/production, especially by spinning. Textile fibers are generally line-shaped constructs having a length-to-diameter ratio of significantly greater than 1, resulting in sufficient bendability and pliability. Spinnable fibers of finite length are usable, but also filaments, i.e., continuous fibers, in the form of mono- or multifilaments. Textile fibers also include flock fibers, although they are not spinnable, and also rubber fibers, metal fibers or spinning paper provided these are processable in a textile manner.

The textile fibers used may preferably be natural fibers. These natural fibers may be mineral-type natural fibers, for example asbestos fibers or rockwool, vegetable-type natural fibers, for example cotton fibers, flax fibers or hemp fibers, or else animal-type natural fibers, for example wool or silk.

Useful textile fibers may further include with preference fibers composed of natural polymers, for example cellulose-based regenerated fibers, such as viscose, lyocell or gum, or else fibers composed of synthetic polymers, for example polyacrylonitrile, polypropylene, polyester, polyamide, polyurethane, polyphenylene sulfide, polyoxadiazole, aramid, copoly para aramid, polyimide, polyether imide, polyether ether ketone, polyethylene 2,6-naphthalate, polyphenylene, polyphenylene oxide, polyphenylene sulfide, polyphenylene ether, polybenzoxazoles.

It is similarly conceivable to use textile fibers composed of inorganics such as glass, ceramic, carbon, metal or rock, for example basalt.

The textile fibers may be used alone or in combination, i.e., as a hybrid fiber.

Which fibers are used for the sheetlike or spacelike textile construct depends essentially on the nature of the article, whether it is for example a rubber-metal element/vibration damper or an air spring, on the composition of the polymeric main body, on the nature of the bond of the sheetlike or spacelike construct to the main body—whether it is firmly adherent or not firmly adherent, and on the application planned for the article. It is the application which essentially determines the elasticity and flexibility requirements which the article has to meet throughout its entire service life.

Certain fibers offer an adequate level of fire protection in and of themselves, examples being polyoxadiazole, polyether imide, aramids, such as m-aramid, p-aramid or co-poly-para aramid, metal, glass, ceramic, rock, carbon, modified polyester, modified viscose. The recited materials are usable alone or in combination, for example as a hybrid yarn. An additional fire-retardant finish may be eschewable under certain circumstances. The recited materials may have also been incorporated in the textile as blocking threads in the manner of DE 10 2012 112 581 A1.

In a particularly preferred embodiment, the sheetlike or spacelike textile construct is finished with at least one fire-retardant substance. Finished in the context of the present invention is to be understood as having the following meaning:

The flame-retardant substance is applied to the sheetlike or spacelike textile construct by spreading, spraying, squeegeeing or dipping or via a calendering process.

For this purpose, the flame-retardant substance is preferably in a solution or mixture of suitable viscosity. This solution or mixture is preferably waterborne, free from organic solvents, free from halogens and halogen compounds and additionally contains at least one binder.

The flame-retardant substance is applied to the individual textile fiber of the sheetlike or spacelike textile construct by spreading, spraying or dipping. For this purpose, the flame-retardant substance is preferably in a solution or mixture of suitable viscosity. This solution or mixture is preferably waterborne, free from organic solvents, free from halogens and halogen compounds and additionally contains at least one binder. Penetration of the flame-retardant substance into the textile fiber is particularly good in this case. It is only thereafter that the flameproofed textile fiber is used to produce the sheetlike or spacelike textile construct. This provides a particularly good finish with the flameproofing agent to the textile construct.

The fire-retardant finish on the sheetlike or spacelike textile construct is in either case preferably cold-vulcanized, more preferably crosslinked in a reaction with atmospheric oxygen or by UV irradiation, using peroxides suitable for this.

Finishing of the textile with the fire-retardant substance may be effected one-sidedly or both-sidedly.

When the sheetlike or spacelike textile construct combines with the article surface to form an adhesively bonded assembly, the finish with the fire-retardant substance will generally be effected one-sidedly, and this on the outside face of the article. It is perhaps possible for the adhesion-promoting layer used to form an adhesively bonded assembly, or the adhesion promoter, itself to be additionally finished fire-retardingly.

When the cover is not in direct contact with the article surface, a particularly preferred embodiment provides that the sheetlike or spacelike textile construct be finished fire-retardingly from both sides, i.e., from the front and from the back.

The flameproofing agent used may be any flameproofing agent known to a person skilled in the art.

Materials that can be used here are in particular stannates, such as zinc stannate or zinc hydroxystannate, hydroxides, such as magnesium hydroxide or aluminum hydroxide, cyanurates, such as melamine cyanurate, borates, such as zinc borate, phosphorus-containing components, such as resorcinol diphosphate or aromatic polyphosphates, nitrogen-containing components, such as ammonium phosphate, intumescent mixtures, carbonates, such as calcium carbonate or magnesium carbonate, or expandable graphite. Intumescent mixtures expand to give foams. They are used to provide protection from the effects of heat and fire to combustible materials such as plastics or wood, and also steel, which suffers a loss of strength at elevated temperature.

Optionally, small amounts of antimony trioxide may also be additionally used, despite the hazard to health, in combination with at least one of the recited flameproofing agents.

The cover may also comprise at least one shrink film.

This shrink film may be used alone or in combination with at least one sheetlike textile construct and/or with at least one spacelike textile construct. The cover may thus consist of one layer or of two or more layers.

Shrink films are cold-stretched thermoplastic films which on heat treatment in particular recontract to their original state. This property of shrinking is exploited in the present articles to ensure that the film firmly rests partially or completely on the article surface. The shrink film for this preferably takes the form of a shrink tube. The shrink tubes which may be used here shrink on heating, but the use of so-called "cold-shrink tubes" is also possible. The latter need no heat effect whatsoever, which offers the advantage that the reversion of the polymer mixtures underneath the cover is reduced or prevented. Useful bases for the shrink film include, for example, polyethylene terephthalate, polyethylene, polyvinyl chloride or—particularly for cold-shrink tubes—EPDM or silicone. The shrink film may be inherently fire-retardant or have a fire-retardant finish.

In a particularly preferred embodiment, the shrink film has a finish with at least one fire-retardant substance. Finished in the context of the present invention is to be understood as having the following meaning:

The flame-retardant substance is applied to the shrink film by means of the methods known to the person skilled in the art, such as, for example, spreading, spraying, squeegeeing or dipping or during a calendering process. For this purpose, the flame-retardant substance is preferably in a solution or mixture of suitable viscosity. This solution or mixture is preferably waterborne, free from organic solvents, free from halogens and halogen compounds and additionally contains at least one binder.

The shrink film is finished with the flame-retardant substance directly. For this, the flame-retardant substance is added to the film material, with or without further constituents, in the course of the production of the film and subsequently the film is produced in a manner known to a person skilled in the art, for example by calendering. This has the advantage of obviating the need for a separate additional processing step.

The fire-retardant finish on the shrink film is in both cases preferably cold-vulcanized, more preferably in a reaction with atmospheric oxygen or by UV crosslinking, using peroxides suitable for this. This ensures that no pre-shrinkage of the film occurs.

Finishing of the shrink film, especially the shrink tube, with the fire-retardant substance may be effected one-sidedly or both-sidedly.

When the shrink film combines with the article surface to form an adhesively bonded assembly, the finish with the fire-retardant substance will generally be effected one-sidedly, and this on the outside face of the article. It is perhaps possible for the adhesion-promoting layer used to form an adhesively bonded assembly, or the adhesion promoter, itself to be additionally finished fire-retardingly.

When the cover is not in direct contact with the article surface, a particularly preferred embodiment provides that the shrink film, especially the shrink tube, be finished fire-retardingly from both sides, i.e., from the front and from the back.

The flameproofing agent used may be any flameproofing agent known to a person skilled in the art.

Materials that can be used here are in particular stannates, such as zinc stannate or zinc hydroxystannate, hydroxides, such as magnesium hydroxide or aluminum hydroxide, cyanurates, such as melamine cyanurate, borates, such as zinc borate, phosphorus-containing components, such as resorcinol diphosphate or aromatic polyphosphates, nitrogen-containing components, such as ammonium phosphate, intumescent mixtures, carbonates, such as calcium carbonate or magnesium carbonate, or expandable graphite. Intumescent mixtures expand to give foams. They are used to provide protection from the effects of heat and fire to combustible materials such as plastics or wood, and also steel, which suffers a loss of strength at elevated temperature.

Optionally, small amounts of antimony trioxide may also be additionally used, despite the hazard to health, in combination with at least one of the recited flameproofing agents.

The cover is used for the following articles in particular:

Tubular Bodies

Tubular bodies include the product group of feed hoses of any kind, air spring bellows (cross-ply bellows, axial bellows) and compensators in various embodiments (e.g., torsion compensator, lateral compensator). The design concept here is in all cases the same, namely comprising an outer layer (a sheath), an inner layer (a core) and also more particularly an embedded single- or multi-ply strength member. There may additionally be present at least one interlayer, for example between two strength member plies. In the case of feed hoses, the inner layer may additionally display a media-resistant inliner, for example in the form of a PTFE film, for example in the case of hoses for feeding chemicals. An additional barrier layer having a low rate of permeation may additionally also be present, in particular in the form of films, for example as polyamide film, in which case air conditioning hoses may be mentioned here in particular. The outer layer of a tubular body, more particularly the entire surface of the outer layer, is finished with the cover.

Drive Belts

Drive belts, which are usually provided an embedded strength member having tensile members (tensile strands) in a parallel arrangement in the longitudinal direction, occur in various forms, namely as flat belts, V-belts, V-ribbed belts, toothed belts and composite ropes each having a substructure with a power transmission zone and a top ply as belt backing. The essential difference resides in the construction of the power transmission zone, due to different surface geometries, for example due to a tooth-shaped profiling in the case of toothed belts. The cover is used particularly in the power transmission zone, optionally additionally also in the top ply. The cover may further be used in addition to the flame-retardant edge-sealing system.

Damping Element of a Bearing, of a Bushing or of a Multilayered Spring, Cone Spring The damping element comprises a polymeric material having elastic properties and is usually employed as part of a metal-polymer composite, in the form of a bearing having an upper bearing part and a lower bearing part, a bushing featuring core and sleeve or a metal-rubber spring element, such as, for example, a multilayered or cone spring. It is preferable here for all free surfaces of the damping element to be provided the cover.

Particular importance attaches to the air spring bellows more particularly presented hereinafter in connection with the description of the figures.

To form the main body, it is particularly (partially) vulcanizable polymeric mixtures which are used, the following two variants of material being recited on account of their elastic properties:

Variant A (Elastomers)

The polymer mixture is a rubber mixture which is vulcanizable, and thermoplastic-free and comprises at least one rubber component and further mixing ingredients. Useful rubber components include in particular: ethylene-propylene rubber (EPM), ethylene-propylene-diene monomer rubber (EPDM), nitrile rubber (NBR), (partially) hydrogenated nitrile rubber (HNBR), fluoro rubber (FKM), chloroprene rubber (CR), natural rubber (NR), styrene-butadiene rubber (SBR), isoprene rubber (IR), butyl rubber (IIR), bromobutyl rubber (BIIR), chlorobutyl rubber (CIIR), brominated copolymer of isobutylene and para-methylstyrene (BIMS), butadiene rubber (BR), chlorinated polyethylene (CM), chlorosulfonated polyethylene (CSM), polyepichlorohydrin (ECO), terpolymers of ECO with ethylene oxide and unsaturated monomers (ETER), ethylene-vinyl acetate rubber (EVA), acrylate rubber (ACM), ethylene-acrylate rubber (AEM), silicone rubber (MQ, VMQ, PVMQ, FVMQ), fluorinated methylsilicone rubber (MFQ), perfluorinated propylene rubber (FFPM), perfluorocarbon rubber (FFKM), polyurethane (PU).

The aforementioned types of rubber may be uncut. It is similarly possible to use a blend, in particular in conjunction with one of the aforementioned types of rubber, examples being an NR/BR blend or a BR/SBR blend.

Which type of rubber is preferred depends on the nature of the article. The use of various types of rubber is particularly diverse in the case of tubular bodies for which the following rubber components may be mentioned here in particular: NR, IR, ACM, AEM, BIMS, CM, CR, IIR, BIIR, CIIR, ECO, EPM, EPDM, ETER, EVA, FKM, HNBR, VMQ or FVMQ. Drive belts utilize particularly rubber mixtures based on EPM and/or EPDM (in the case of V- and ribbed V-belts) and also NBR, but specifically HNBR (in the case of toothed belts).

Mixing ingredients of the customary type include at least one crosslinker or crosslinker system (crosslinking agent plus accelerator). Additional mixing ingredients usually yet include a filler and/or a processing aid and/or a plasticizer and/or an antioxidant and also optionally further additives (e.g., color pigments, reinforcing fibers). In this regard, reference is made to the general art of rubber mixing technology.

Variant B (Thermoplastic Elastomers)

The polymer mixture is a part-vulcanizable polymer mixture comprising at least one thermoplastic component, at least one rubber component, which is at least part-crosslinkable, and also further mixing ingredients. The preferred thermoplastic components are: polyolefin, especially polyethylene (PE) or polypropylene (PP), polystyrene (PS), polyamide (PA), for example PA6 or PA66, polyester, for example PET, PEN or PBT.

Useful rubber components here include particularly EPM, EPDM, SBR, CR, NR, NBR, FKM, ACM or AEM, which are more particularly not blended with any further rubber component.

The usual mixing ingredients pertaining, reference is made to the mixing technology relating to variant A, particularly to the teaching as per Offenlegungsschrift DE 100 04 632 A1.

The invention is now more particularly described by means of exemplary embodiments with reference to schematic drawings, where:

Figures 1, 2:
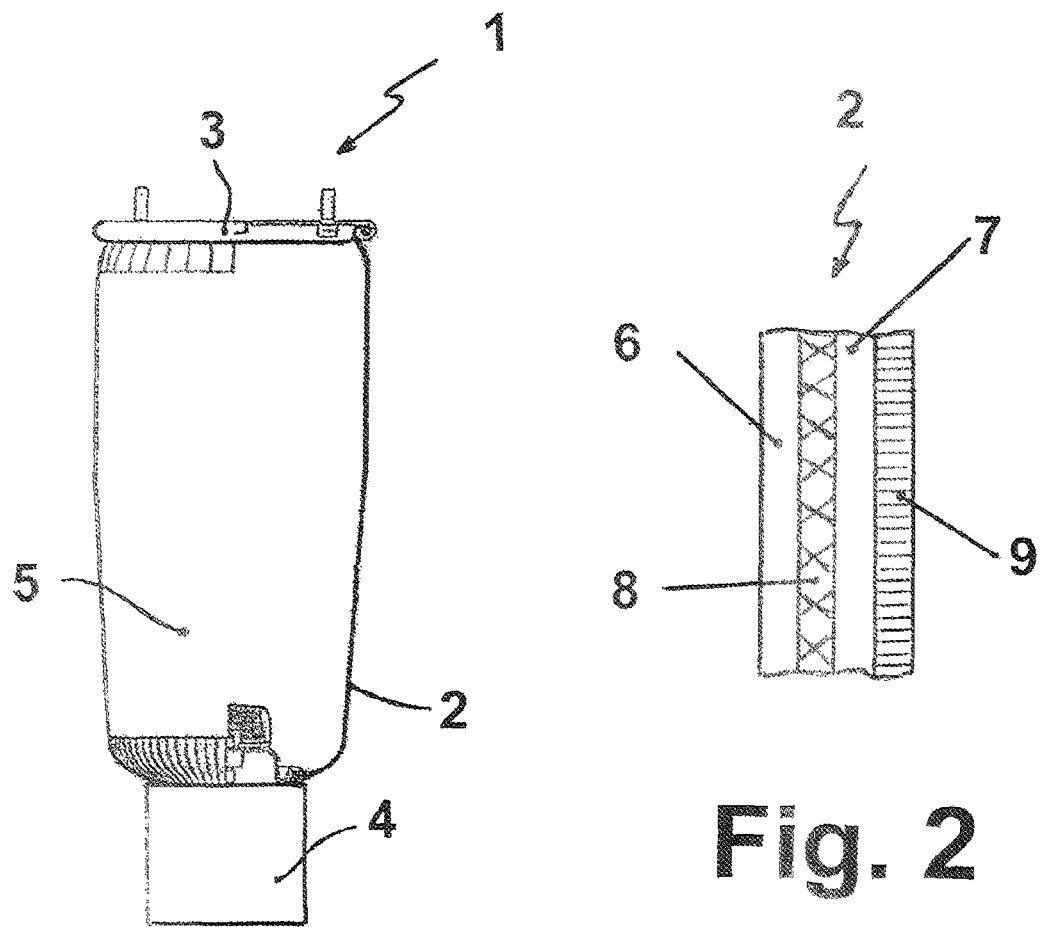
FIG. 1 shows an air spring arrangement.
FIG. 2 shows the layered construction of an air spring bellows comprising a cover composed of a weave having a flame-retardant finish.

FIG. 1 shows an air spring arrangement 1 comprising an air spring bellows 2 and also the two connection components in the form of lid 3 and rolling piston 4, to form an elastic-volume air chamber 5.

FIG. 2 then shows the layered construction of a finalized air spring bellows 2. This air spring bellows consists of an inner layer 6 and an outer layer 7 as elastic main body, for example composed of a vulcanized mixture of rubber based on NR, a strength member layer 8, for example in the form of a polyamide weave, embedded between the inner layer 6 and the outer layer 7, and also of a cover 9, which is in direct contact with the outer layer 8. The cover 9 in the form of a weave has a finish with at least one flame-retardant agent.

LIST OF REFERENCE SIGNS

Part of the Description

1 air spring arrangement
2 air spring bellows
3 lid
4 rolling piston
5 elastic-volume air chamber
6 inner layer of an air spring bellows
7 outer layer of an air spring bellows
8 strength member layer of an air spring bellows
9 cover

The invention claimed is:
1. An air spring bellows comprising a polymeric material having elastic properties, wherein the air spring bellows has a surface which is at least partially covered with at least one cover, and wherein the cover is formed from a shrink film comprising EPDM or silicone.
2. The air spring bellows as claimed in claim 1, wherein the shrink film is configured as a shrink tube.

\* \* \* \* \*